Oct. 9, 1956 A. HOCK 2,765,922
STRAINER
Filed Dec. 27, 1948 6 Sheets-Sheet 5

INVENTOR.
ALVIN HOCK
BY
Joseph A. Pave
ATTY.

United States Patent Office 2,765,922
Patented Oct. 9, 1956

2,765,922

STRAINER

Alvin Hock, Cincinnati, Ohio, assignor to Brighton Corporation, Cincinnati, Ohio, a corporation of Ohio Application December 27, 1948, Serial No. 67,261

4 Claims. (Cl. 210—151)

This invention relates to improvements in separators or strainers and particularly to a separator for separating or straining a syrup or the like from solid particles, such for example as separating hops and cereals from wort after the same has been brewed or boiled.

The application is an improvement on the mechanisms and combinations disclosed in co-pending applications Serial No. 708,261, filed November 7, 1946, now Patent No. 2,627,349, dated February 3, 1953, and Serial No. 744,488, filed April 28, 1947 now Patent No. 2,633,992, dated April 7, 1953.

The principal object of the present invention is the provision of a separator for separating or straining a liquid from solid particles.

Another object of the present invention is the provision of a strainer for the purpose set out above in which the separating or straining process is in progressive stages, such as, first permitting the run off of the main liquid from the solid particles contained therein and then processing the solid particles to recover any liquid contained therein.

A further object of the present invention is the provision of a separator in which the separation of the syrup or liquid from the solid particles is effected by progressive stages, as pointed out above, in which the said stages of separation are effected within a single housing but without interference with one another.

A still further and more specific object of the present invention is the provision of a separator for separating syrups or the like from solid particles, of the type set out above, in which the second of said separating stages has been provided with mechanical tumbling means to permit the recovery of a maximum amount of syrup or liquid and said second stage of separation has during process thereof a mechanism for sparging or washing down of the said solid particles to insure that all possible syrup or liquid has been recovered.

It is also an object of the present invention to provide a strainer of the class described in which there has been provided a means for observing the separation or straining of the liquid from the solid particles at all times during the said process.

It is also an object of the present invention to provide a strainer of the kind above set forth in which means are provided, so that access may be readily had to the interior thereof for cleaning purposes to prevent the adherence of residue to the interior of the strainer, which may affect the quality of batches subsequently sent through the strainer.

It is a still further object of the present invention to provide in a strainer of the kind set forth in the paragraph immediately above, means for mounting the parts thereof so they may be readily accessible and have all surfaces exposed for the purpose of cleaning and sterilizing the same.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 3 is a longitudinal sectional view of the separator of the present invention as may be seen from line 3—3 on Fig. 4.

Throughout the several views of the drawings similar reference characters are used to denote the same or similar parts.

As was intimated above, the separator or strainer of the present invention is designed to more efficiently strain or separate liquids, such as syrup, wort or the like, resulting from the boiling or other processing of solids such as hop flowers and cereal in the making of beer and such liquid having suspended therein the said solid. A strainer, per se, for this purpose is not new, but strainers in the past were inefficient and unable to handle the quantity desired at the desired rate. Furthermore, strainers as heretofore employed operated at a continuous rate wherefore there were instances when insufficient time was allowed for the complete drainage of the liquid, syrup or wort from the solid particles prior to the discharge of said particles onto the refuse pile, or the time consumed in permitting this drainage was too great thereby slowing down the amount of material that could be passed through the strainer in an allotted time for straining. Certain of these separators of the past have had a plurality of straining troughs with one of the said straining troughs being disposed above the other and a deflector means positioned therebetween to receive the liquid from the first of the said strainers and deflect the liquid or syrup so the said syrup will pass beyond the second of the strainer troughs and therefore not be received therein. This practice, it has been found, results in the loss of time in keeping the deflector clean and added to the complexity of the construction of the strainer or separator. Also as is noted above, sparging in the past consisted of merely treating the exterior of a massed amount of sodden particles that clung to one another thereby losing a large amount of desirable syrup, liquid, wort or the like, that was entrapped within the massed particles.

By the present construction, as will later be made clear, each of the foregoing disadvantages of prior strainers has been overcome in the strainer of the present invention. It should be noted that the construction of the present strainer has not been unduly complicated to effect these advantages but instead the construction has been held to as simple as possible thereby producing a simple yet economical strainer.

Specifically, the strainer of the present invention comprises a housing, indicated in general by the reference numeral 20, with said housing having a front 21 and a back 22 and said front and back walls 21 and 22 joined together by end walls 23 and 24 and a top 25 with the forward portion of the top 25 inclined as at 26. The lower portion of the housing 20 is adapted to form a receiving tank 27 whereby the syrup, wort or the like, removed from the solid particles in the strainer troughs may be retained until further use thereof is desired. The housing 20 is, as is shown most clearly in Fig. 1, supported by any suitable or desirable means, such as the jack screws 28. It will be further noted from Fig. 1 that the receiving tank 27 has been provided with an outlet 29 to which is connected a valve controlled conduit or pipe (not shown for it forms no part of the present invention) whereby the syrup, wort, or the like, is delivered to the next stage of the processing of the desired product.

The strainer of the present invention will find one of its uses, as intimated above, in the brewing industry and hereinafter where reference is made to the material being strained, it will be referred to as wort and the solid particles will be designated as hop flowers while the liquid drained from the hop flowers will be designated as syrup. It is to be understood however that the strainer of the present invention is not limited to the straining of wort but may be employed wherever a strainer or separator is necessary or desirable.

The wort to be strained is delivered to the strainer through a pipe or conduit (not shown for it also forms no part of the present invention) which is secured to the coupling 30 disposed on the end 23 of the strainer housing. This coupling 30 is illustrated as secured to the end 23 of the strainer housing in any suitable or desirable manner, as by the flange 31. The end of the coupling 30 which is disposed interiorly of the strainer is formed to effect a distributing head or nozzle 32, most clearly shown in Fig. 4 as having a rectangular outlet 33 disposed in close proximity to the upper surface of a strainer plate 34.

Figures 4, 5, 10, 15:
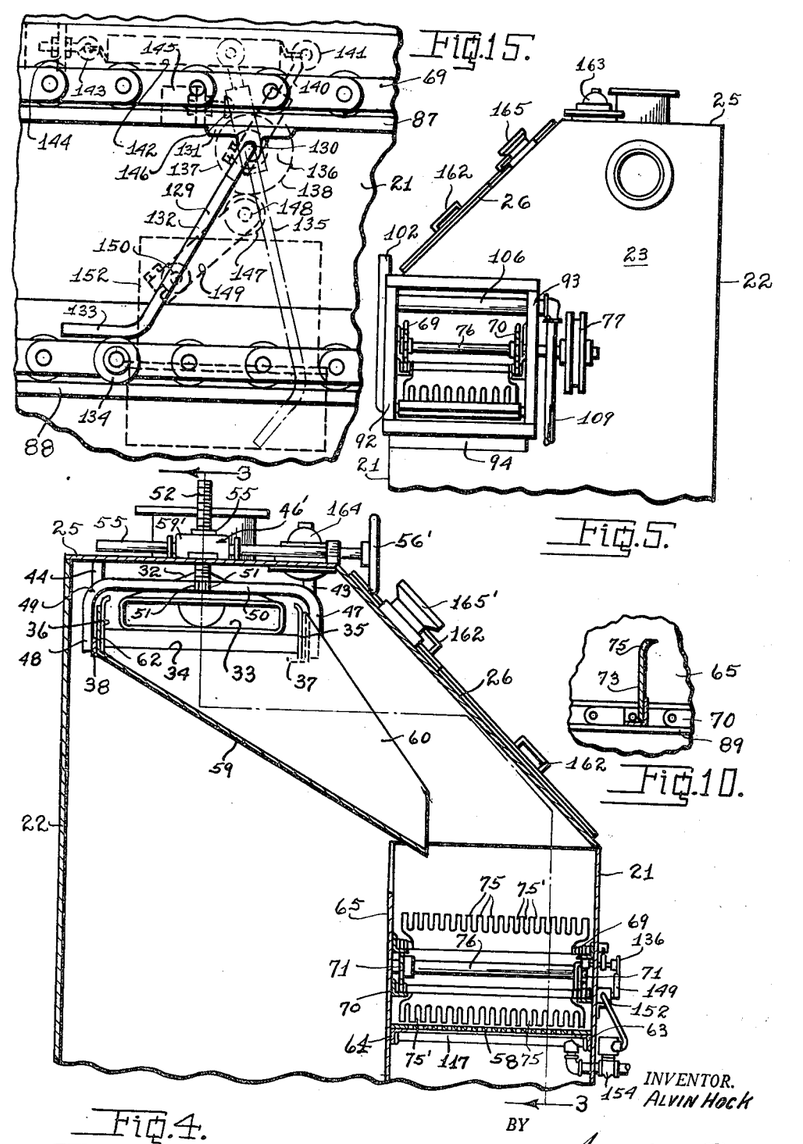
Fig. 4 is a transverse cross-sectional view of the device of Fig. 3 taken on line 4—4 on said Fig. 3.
Fig. 5 is a fragmentary end elevational view of the device of Fig. 1 as seen from the right-hand end of said Fig. 1.
Fig. 10 is a cross-sectional view of one of the rake-like pusher members taken on line 10—10 on Fig. 9.
Fig. 15 is an enlarged fragmentary sectional view of the sparger operating mechanism as seen from line 15—15 on Fig. 9.
Figure 5:
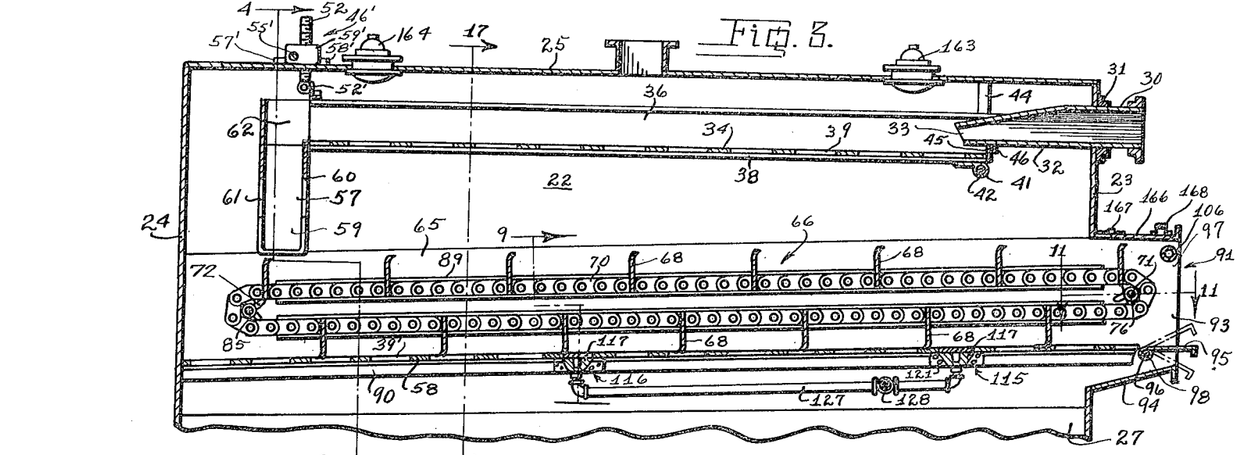

The strainer plate 34, see Figs. 3 and 4, is in effect the base or bottom of a trough having upright or upstanding sides 35 and 36 secured to the said strainer plate 34 through the use of the angle-irons 37 and 38 each having one of the legs thereof located below the strainer plate 34 and the other of the said legs connected to one of the sides 35 and 36. As illustrated in the drawings the strainer plate 34 is of a continuous length but may be, and in practice is, a series of short plates butted against one another and supported by the angle-irons 37 and 38.

Figure 6:
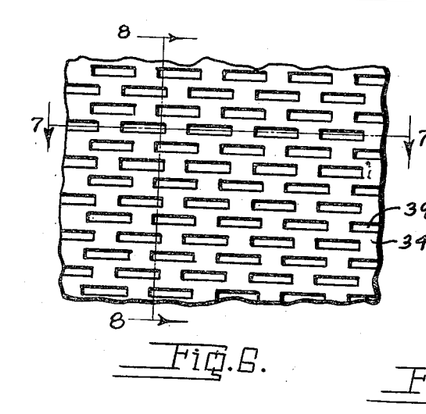
Fig. 6 is an enlarged fragmentary view of the straining screen or plates to be used with the device of the present invention.
Figures 7, 8:
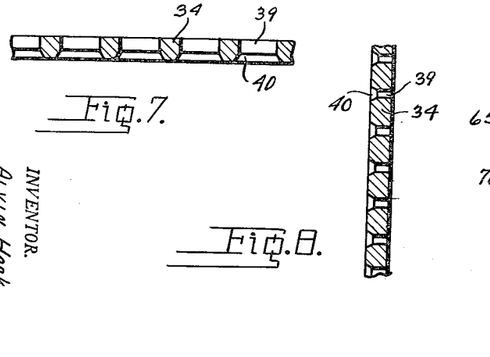
Fig. 7 is a longitudinal cross-sectional view taken on line 7—7 on Fig. 6.
Fig. 8 is a transverse cross-sectional view taken at right angles to Fig. 7 on line 8—8 on Fig. 6.

The strainer plate 34 is most clearly disclosed in Figs. 6, 7 and 8 as having a series of elongated apertures 39 formed therethrough. These apertures 39 are illustrated as axially or longitudinally disposed in the said plate and as illustrated in Fig. 6 are of greater length than width. It should be noted that each of the apertures 39 in the strainer plate 34 has its walls materially flared, outwardly, on the undersurface of the said strainer plate, as is illustrated in Figs. 7 and 8 at 40. It is to be understood that this construction, set forth above, is the desirable construction and that any other type of construction suitable for the purpose may be used.

As is illustrated in Figs. 3 and 4 the end of the strainer plate 34 adjacent which is disposed the distributing head 32 has secured to the undersurface thereof hinge eyes 41 having disposed centrally therein hinge pin 42. The ends of the hinge pin 42 are secured to and carried by, in any suitable or desirable manner, a pair of end bars 43 and 44 whereby the hinge 41—42 is secured to the housing. Upstanding from the hinged end of the strainer plate is an end plate 45 having its upper edge reinforced as at 46 to act as a rest or support for the inner end of the distributor head or nozzle 32.

Secured to the other or discharge end of the strainer trough is an adjusting mechanism, indicated as a whole by the reference character 46'. This adjusting mechanism, most clearly shown in Figs. 3, 4, 12 and 13, is secured to the angle-irons 37 and 38 of the strainer trough through the legs 47 and 48 of a U-shaped bracket 49. Spacing the legs 47 and 48 of the U-shaped bracket 49 from one another is a base or spacing member 50 having substantially centrally thereof and rearwardly disposed ears 51 spaced from one another to receive between them the lower end of an adjusting screw 52 and through the screw end and ears pass a pivot 52'.

Figures 12, 13, 14, 16:
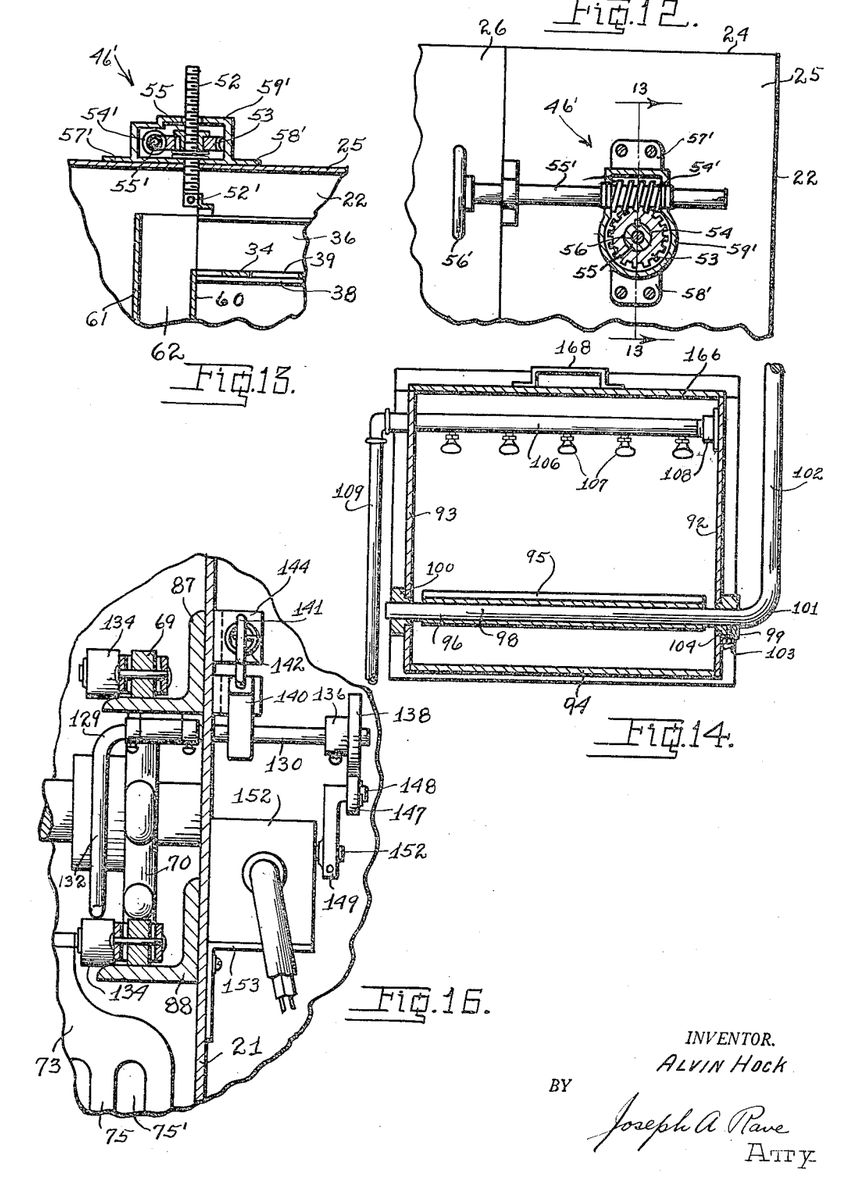
Fig. 12 is an enlarged, horizontal, fragmentary, sectional view of the strainer plate adjusting mechanism as seen from line 12—12 on Fig. 1.
Fig. 13 is a fragmentary sectional view of the adjusting mechanism of Fig. 12 as seen from line 13—13 on said Fig. 12.
Fig. 14 is a transverse cross-sectional view of the discharge mechanism of the separator as may be seen from line 14—14 on Fig. 1.
Fig. 16 is an enlarged fragmentary sectional view of the sparger operating means as may be seen from the right-hand end of Fig. 15.
Figure 17:
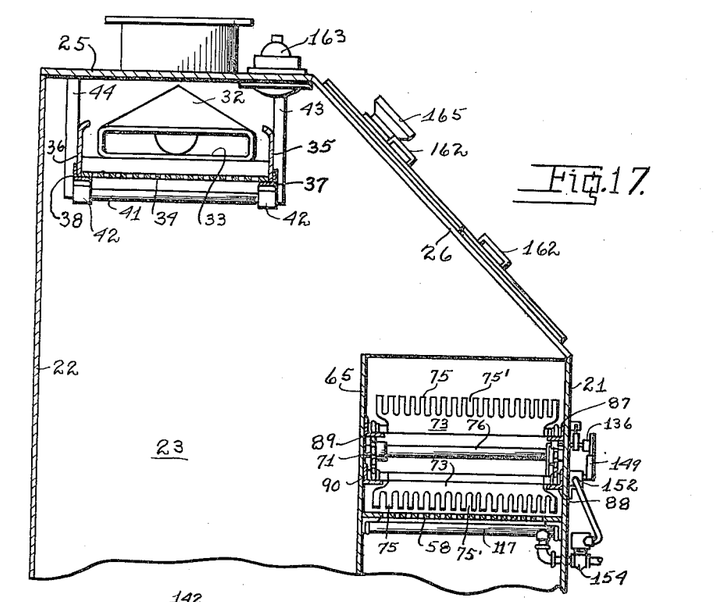
Fig. 17 is a fragmentary vertical sectional view through the strainer mechanism taken in a plane ahead of that of Fig. 4 as seen from line 17—17 on Fig. 3.
Figure 18:
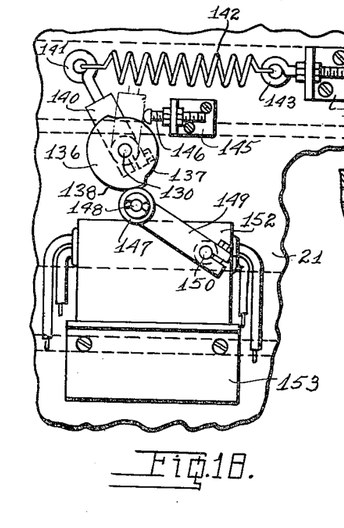
Fig. 18 is a fragmentary elevational view of the parts of Fig. 15 as seen from the exterior of the strainer trough or from the opposite side of Fig. 15.
Figure 19:
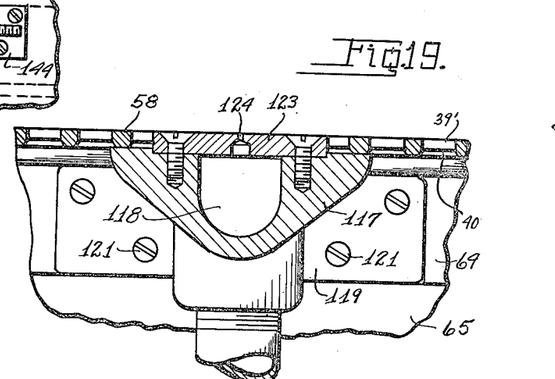
Fig. 19 is an enlarged sectional view through the sparger housing or member as seen from line 19—19 on Fig. 9.

Referring specifically to Figs. 12 and 13, the adjusting means is disclosed as having a worm gear 53 with the means is centrally apertured as at 54 to receive a threaded sleeve 55 to be keyed or otherwise secured therein. The sleeve 55 is also centrally apertured, therethrough, as at 56 and with the said aperture threaded to correspond with the threads on the adjusting screw 52 thereby allowing the said screw to be screwed therein. Enmeshed with the worm gear 53 is a worm 54' secured to or integral with a shaft 55'. The shaft 55' has at its outer or forward end a handwheel 56' secured to the said worm shaft in any suitable or desirable manner. It is to be understood that the worm and worm gear of the adjusting means may be disposed in any suitable or desirable housing 59', such as the one disclosed in the drawings, and having ears 57' and 58' whereby the said housing may be secured to the strainer top 25.

The operation of the adjusting means is believed evident since the user on desiring to adjust the inclination of the strainer plate 34 need only to turn the handwheel in the direction that will produce the upward or downward inclination of the strainer plate desired. In rotating the handwheel 56' the worm shaft 55' and worm 54' are also rotated thereby causing the worm wheel 53 and the collar 55 to rotate and raise or lower the screw 52. It is believed evident that as the screw 52 is raised or lowered the inclination of the strainer plate will be changed to correspond with the said movement of the screw 52.

As is most clearly shown in Figs. 3 and 4, the strainer plate 34 discharges into a latterly and downwardly directed directing chute 57, whereby the wort may be delivered to the second or lower and upwardly inclining strainer plate 58. The chute 57 as seen from Figs. 3 and 4 has a downwardly and latterly disposed base or bottom panel 59 with side walls 60 and 61 upstanding therefrom with upper end of the bottom 59 upwardly disposed to form a back 62. It is to be understood that the chute 57 is arranged with respect to the strainer plate 34 in any suitable or desirable manner to provide a suitable joint between them.

The operation of the mechanism thus far described is as follows:

The wort to be strained enters the strainer through the coupling 30 thereby passing through the distributing head 32 to the strainer plate 34. The distributing head 32, as may be seen from Fig. 4, is of a width that is substantially the width of the strainer trough whereby the wort is distributed over the entire width of the said strainer trough. The wort is moved along the strainer trough by gravity with the syrup from the said wort passing through the apertures 39 in the strainer plate and falling into the receiving tank 27. The remainder of the wort is then received by the chute 57 whereby it is diverted to the second of the strainer plates, 58, for further processing.

The strainer plate 58 similar to the strainer plate 34 has a series of apertures 39′ passing therethrough with each of the said apertures 39′ outwardly flared as at 40′. As is the case with the strainer plate 34 the apertures 39′ of the strainer plate 58 are of greater length than width and as pointed out above the strainer plate is shown as of a continuous length but may be, and in practice is, a series of short sections butted against one another.

The wort to be strained, as pointed out above, is delivered to the strainer plate 58 from the strainer trough by the chute 57. The strainer plate 58 is retained in its upwardly operative position through the use of the angle-irons 63 and 64, as may be seen most clearly from Figs. 3, 4 and 9. The angle-iron 63 has one of its legs secured to the strainer housing front 21 while the other of the said legs is disposed beneath the strainer plate 58. Similarly, the angle-iron 64 has one of its legs disposed beneath the strainer plate 58 while the other of the said legs is secured to a retaining member or plate 65. It is to be noted from Figs. 3, 4 and 9 that the retaining plate 65 is of substantially the same length as the strainer plate 58 thereby providing a trough for the wort to be strained to be passed therethrough with the said trough having the strainer plate 58 as a base and the walls thereof formed by the retaining plate 65 and the front wall 21 of the strainer housing.

Figure 9:
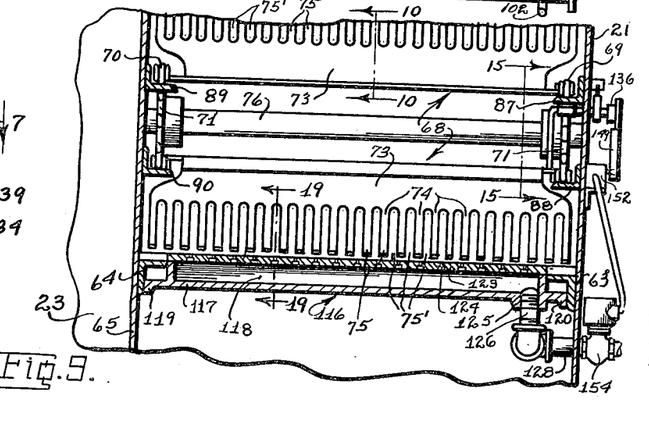
Fig. 9 is an enlarged fragmentary sectional view of a portion of Fig. 4 as may be seen from line 9—9 on Fig. 3.

The strainer plate 58 has been provided with a means 66 whereby the wort to be strained therethrough is tumbled along the said strainer plate. This means, as may be seen from Fig. 3, is a series of rake-like pusher members, each indicated by the reference numeral 68 carried by the endless chains 69 and 70 which in turn are driven by the sprockets 71 and 72. The rake-like pusher members 68, most clearly seen in Figs. 9 and 10, are disclosed as having a body portion 73 with the said body portion having fingers 75 providing an open space portion 75′ between the said fingers. It is to be here noted that each of the fingers 75 has the end thereof that comes in contact with the wort arced as at 75, see Fig. 10, whereby the hop flowers and cereals of the wort are tumbled along the strainer plate. This arcing of the ends of the fingers 75, as shown in Fig. 3, it has been found, will give the wort to be moved along the strainer plate a tumbling motion and will prevent the wort from being bruised or smashed yet the tumbling motion will tend to open all pockets formed in the wort and allow the said pockets to drain. It also has been found that if the rake-like pusher members 68 are not arced or the arcing is reversed to that of Fig. 3, the hop flowers and cereals contained in the wort will be bruised and undesired flavor contained therein will be strained or separated from the wort.

Figure 11:
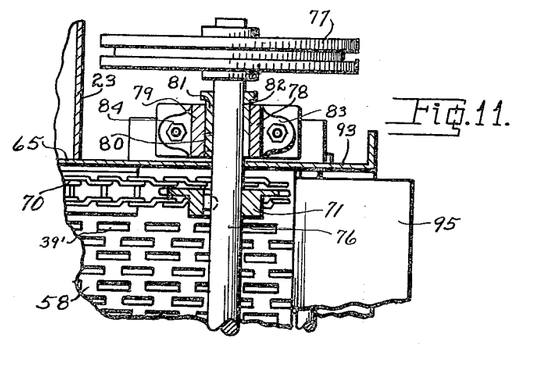
Fig. 11 is an enlarged fragmentary cross-sectional view of the driving mechanism of the present invention as seen from line 11—11 on Fig. 3.

The endless chains 69 and 70 by which the rake-like pusher members are carried are of the flexible type and are driven by the sprockets 71 and 72 each located at opposite ends of the strainer housing. The sprockets 71, or the driving sprockets, most clearly shown in Fig. 11, are keyed or otherwise suitably secured to opposite ends of a driving shaft 76 with the said driving shaft 76 having a portion projecting outwardly of the tank front to have at its outer end a pulley 77. It is to be understood the rake-like member's drive need not necessarily be driven by the conventional pulley drive system shown in the drawings, but may be, and is in actual practice, driven by an electric motor through suitable speed changing mechanisms or may be driven in any manner suitable or desirable to the user.

The driving shaft 76 is retained in operative position through the use of the bearing members, each indicated as a whole by the reference numeral 78, disposed adjacent each end of the said shaft. The bearing member, see Fig. 11, is of the usual construction having a body portion 79 centrally apertured, as at 80, with the said aperture 80 having disposed therein a bushing 81 similarly apertured, as at 82, to receive the driving shaft 76. The bearing member body portion 79 has been provided with the ears 83 and 84 whereby it may be secured to the strainer housing in any suitable or desirable manner.

Figure 1:
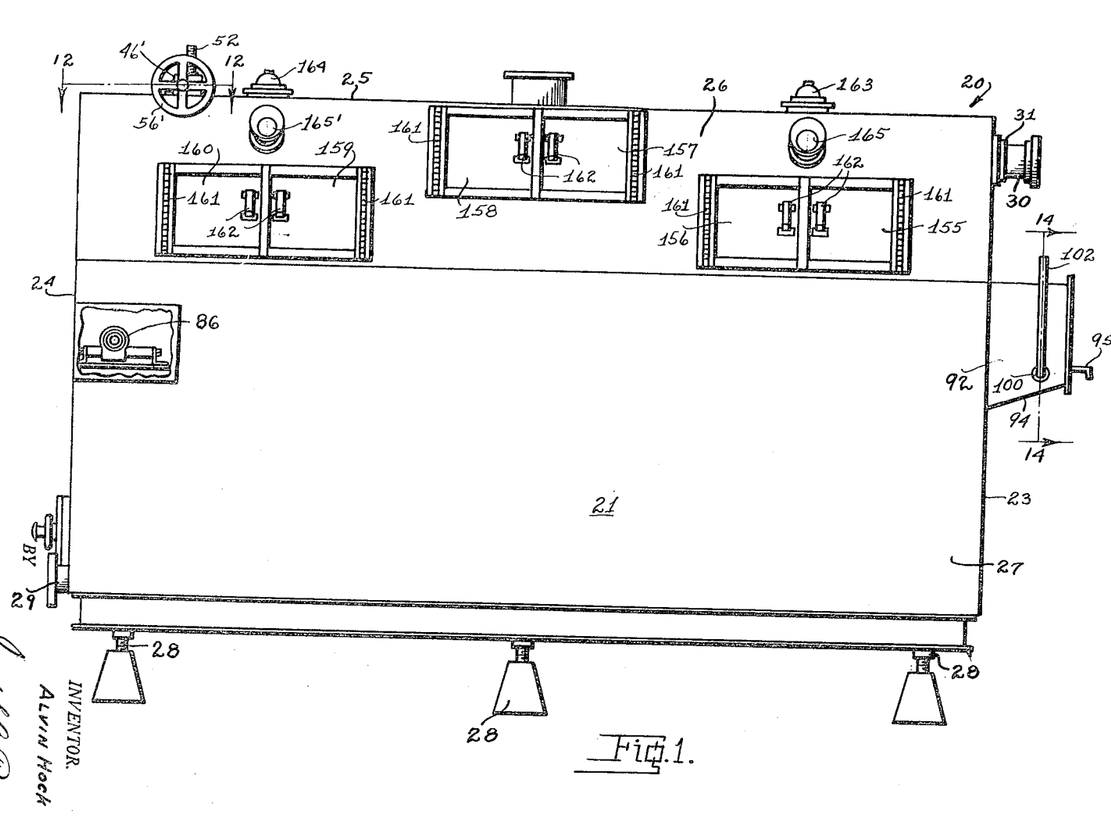
Fig. 1 is a front elevational view of a separator embodying the principles of the present invention.

The sprockets 72 or the idler sprocket, disposed at the opposite end of the strainer housing, are mounted on an idler shaft 85. This idler shaft 85 is mounted in bearing members 86, similar to the bearing members 78, with the said bearing members, respectively, mounted on a movable slide, as shown in Fig. 1, whereby the idler shaft 85 may be moved either to the right or the left for increasing or decreasing the tension in the chains 69 and 70.

Due to the length of the pusher members actuating chains 69 and 70 the front wall 21 and the retaining plate 65 have been provided with supporting angle-irons 87, 88, 89 and 90 for said chains, with the said angle-irons 87 and 88 secured to the housing front 21 and the angle-irons 89 and 90 secured to the retaining plate 65. As most clearly shown in Fig. 9 the angle-irons 87 and 88 each have one of the legs thereof secured to the housing front 21 while the other of the said legs, respectively, supports the upper and lower reaches of the flexible chain 69. The angle-irons 89 and 90, similar to the angle-irons 87 and 88, each have one of the legs thereof secured to the retaining plate 65 while the other of the said legs supports the upper and lower reaches of the flexible chain 70.

As may be seen from the right-hand end of Fig. 3 the strainer housing has been provided with a supplemental or discharge housing, indicated as a whole by the reference numeral 91. This discharge housing has the side walls thereof 92 and 93 formed by extensions of the front 21 and the retainer plate 65 of the lower strainer trough housing with a bottom 94 secured thereto in any suitable or desirable manner.

Disposed within the discharge housing at the end of the strainer plate 58 and in alignment therewith is the discharge plate 95. The discharge plate 95 most clearly shown in Figs. 3, 11 and 14 is of a width substantially the same as the width of discharge housing 91 with one end of the said plate pivotly mounted as at 96 while the other end of the said plate 95 extends beyond the open end 97 of the discharge housing 91. The pivotal mounting of the discharge plate is most clearly shown in Fig. 14 wherein the said plate is shown as being formed around one leg 98 of an L-shaped bar 101 carried by the bearings 99 and 100 respectively suitably secured to the side walls 92 and 93 of the discharge housing. The other leg or handle portion 102 of the bar 101 is upwardly disposed to one side of the discharge housing 91, preferably adjacent the housing side 92 whereby the said handle 102 may be actuated to the right or the left to change the angular position of the discharge plate 95. It is to be here noted that the bearing 99 has been provided with a means whereby the bar 101 may have friction applied thereto to maintain the discharge plate 95 in adjusted positions or the bar 101 may be locked in a desired fixed position. The locking means is in the form of manually operable set screw 103 disposed in a threaded aperture 104 through the bearing block 99, thus by screwing inwardly the thumb screw 103 there is sufficient pressure placed on the bar 101 to retain the said bar in its desired or operative positions.

Disposed within the discharge housing 91 is the sparger which conveniently takes the form of a pipe 106 having connected thereto a plurality of sparger heads or nozzles 107. These sparger heads or nozzles 107, as seen from Fig. 14, are positioned on the pipe 106 so as to sparge or spray the wort on the discharge plate 95. As may be further seen from Fig. 14 the pipe 106 has one end thereof secured to the front wall member 92 by a suitable flanged cap 108 while the other end of the said pipe is secured to the sparging fluid supply pipe 109.

The wort is primarily of a nature that has a tendency to adhere and pack thereby forming pockets within the body of the material that is not readily drained. The tumbling of the wort, as effected by the rake-like members 68, opens up some of the pockets but not all of them. The sparging mechanism to be presently described effectively disbands or separates the said bunched particles to thereby open up the pockets formed therein and effect a more complete tumbling and exposition of the wort.

Accordingly, the sparging device of the present invention contemplates the use of one or more sparging mechanisms located beneath the lower strainer plate 58 of the lower strainer trough; there being two such devices illustrated in the drawings and indicated in general by the reference numerals 115 and 116. The sparging devices 115 and 116 are substantially identical in construction and it is deemed sufficient if but one of them be described in detail.

The sparging device 115 comprises a body member 117 of a length substantially equal to the width of the strainer trough and therefor of a length substantially equal to the width of the trough bottom or plate 58. The body member 117 is provided with a channel 118 substantially the full length thereof and is provided on its ends with ears 119 and 120 which engage the legs of the angle-irons 63 and 64 and are attached thereto by the screws 121. The body member 117 is adapted to receive a plate 123 provided throughout its length with a series of small diameter apertures or holes 124. The apertures 124 are counter-bored from the bottom face of the plate 123 to give them the effect of pressure nozzles for a purpose presently to be described. Intermediate the ends of the body member channel or duct 118 the body member 117 is provided with a depending lug 125 suitably threaded to receive a pipe nipple 126. The pipe nipple 126 is connected with a pipe 127 which conveniently extends to the second sparging mechanism 116. The pipe 127 is further connected with a supply pipe 128 which may go to the same source of sparging medium that the supply pipe 109 is connected with or may be connected to a different source of sparging medium.

The sparging devices 115 and 116 are so constructed that the upper surface of their respective perforated plates 123 is flush with the upper surface of the trough bottom or strainer plate 58. In practice the sparging mechanisms 115 and 116 are located between two of the strainer plates that from the said trough bottom 58 and the perforated plates 123, therefore, each have abutting its opposite longitudinal edges one of the individual strainer plates that make up the trough bottom or strainer plate 58.

The flow through the pipe 128 may be effected at spaced intervals, that is, may have a flow therethrough and through the sparging devices 115 and 116 only at such times as material is lying over the plates 123 or in the act of passing thereover. For this reason the said flow through the pipe 128 and the sparging devices 115 and 116 takes place when the rakes 63 are respectively in the approximate position relative to the sparging devices 115 and 116 as illustrated in Fig. 3. In other words, the wort being conveyed or pushed along the strainer trough bottom or strainer plate 58 extends a comparatively short distance ahead of it wherefore the sparging is effected during the time that the said rakes 68 move from approximately the position illustrated to a position just beyond the sparging devices 115 and 116.

In order to effect this intermittent operation use is made of a control, such for example as illustrated in Figs. 15 and 16, which comprises a crank 129 having a shaft portion 130 journaled in a bearing 131 secured to and depending from the leg of the angle-iron 87 that supports the upper reach of the endless chain 69. The crank 129 at one end of the shaft 130 has depending therefrom an arm 132 the lower end of which is outwardly bent as a finger 133. The finger 133 is adapted to lie in a plane inwardly of the endless chain 69. At spaced suitable and appropriate points the chain 69 is provided with a roller 134 which moves in the plane of the finger 133.

In operation, the rollers 134 are positioned so as to pick up the finger 133 when it and its arm 132 are in the phantom line position 135 in Fig. 15 and to actuate the arm 132 from its phantom line position to the solid line position of the said Fig. 15. The finger 133 is of such a length that it retains the arm 132 in this position for the desired length of time to permit the above described movement of the rakes 68 from their illustrated positions with respect to the sparging devices 115 and 116 to a position beyond the said sparging device and it is contemplated, by way of example, that this will permit the said rakes to cover a distance of from one-fourth to one-third of the distance between adjacent rakes, as this is substantially the distance ahead of each rake that the material extends.

Mounted on the shaft 130 is a cam shaped roller 136 which as seen in Fig. 15 has a peripheral low portion 137 and a peripheral high portion 138 with a connecting rising peripheral portion between them. In addition, the shaft 130 has secured thereto and projecting therefrom an arm 140 provided at its outer end with an eye 141 to which is connected one end of a coil spring 142. The other end of the coil spring 142 is carried by a similar eye 143 carried by a bracket 144 conveniently secured to the front wall 21.

The spring 142 tends to rotate the crank 129 to a position for retaining the crank arm 132 in the phantom line position 135, and it is against the resistance of the spring 142 that the finger 133 of the arm 132 is actuated by the engagement of the roller 134. In order to limit the movement of the crank 129 by the spring 142 and to dispose the crank 129 in the phantom line position, the strainer housing front wall 21 has secured thereto a second bracket 145 carrying an adjustable abutment 146, to be engaged by the arm 140 as illustrated in phantom lines in Fig. 15.

Engaging with the periphery of the cam 136 is a roller 147 freely rotatably mounted at 148 to the end of an arm 149. The arm 149 is secured to a shaft 150 extending through the housing of an electric switch 152. The electric switch 152 is mounted on a bracket 153 secured to the strainer housing front wall 21 and operates a magnetically controlled valve 154 disposed on the said front wall 21 and has connected thereto the sparging fluid supply pipe 128, as is most clearly shown in Fig. 9.

The operation of the sparging device is believed obvious since, as pointed out above, the rakes 68 are moving the wort to be strained along the strainer plate 58. The finger 133 is in the phantom line position 135 until the said finger is engaged and actuated by the roller 134 thereby moving the crank 129 to the solid line position of Fig. 15 and rotating the cam shaped roller 136.

With the rotation of the cam shaped roller 136 the arm 149 is actuated thereby closing the electrical switch 152 and completing the circuit for the magnetic valve thereby causing the said valve to be opened and the sparging medium to flow therethrough and into the channel 118 and sparge the wort passing therethrough.

It is to be understood that when the roller 134 has passed beyond the finger 133 the crank will return to its normal or phantom line position 135 of Fig. 15 and will remain in this position until the rakes 68 have tumbled the next batch of wort to the sparging devices 115 and 116 and the next roller 134 will then engage and actuate the finger 133 to operate the said sparging devices, as pointed out above.

In order to provide for the easy access to the interior of the strainer housing the said housing has been provided with, on the inclined portion 26 of the top, suitable entrance doors or the like. As may be seen from Figs. 1 and 2 the entrance doors 155, 156, 157, 158, 159 and 160 are each suitably hinged on one end, as at 161, to the strainer housing inclined top portion 26 and at the other end thereof are provided with the handles 162.

It is to be here noted that the doors 155 to 160 provide, as pointed out above, a means whereby easy access is made to the interior of the strainer thus providing a means whereby the said strainer may be cleaned and sterilized between subsequent batches of wort. As illustrated in the drawings, the doors 157 and 158 are used to gain access to the strainer plate 34 with the trough formed therewith and the upper portion of the strainer housing while the doors 155, 156, 159 and 160 are used to gain access to the strainer plate 58 and the lower portion of the strainer housing.

Figure 2:
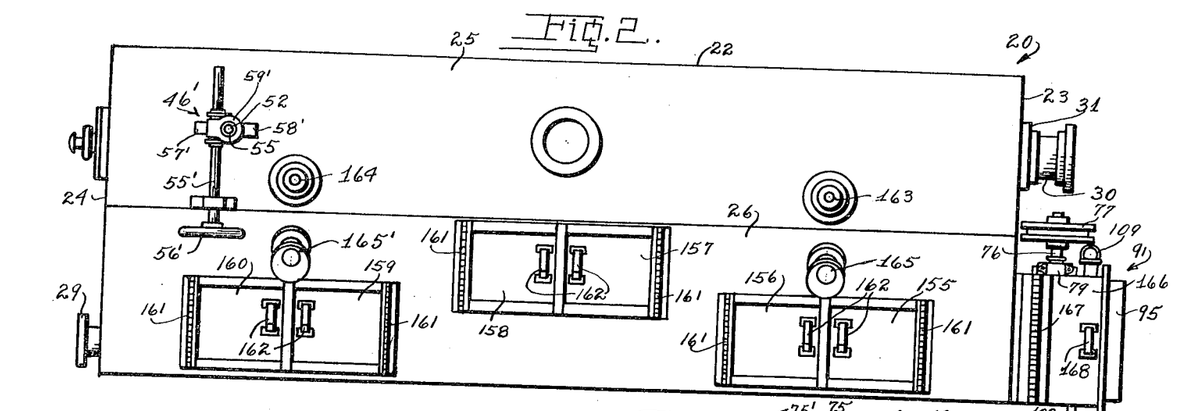
Fig. 2 is a top plan view of the device of Fig. 1.

The discharge housing 91 has been provided with an entrance door 166, most clearly seen from Figs. 2 and 14. As may be seen from Fig. 2, the door 166 has its one end hingedly connected to the top wall of the housing, as at 167 and has on the other end thereof a handle 168. It is believed evident that the door 166 provides an entrance to the discharge housing thereby permitting the ease of access thereto.

The strainer housing has also been provided with an illuminating means in the form of the vapor-proof lights 163 and 164 whereby the interior of the said housing is illuminated. To be used in combination with the lights 163 and 164 are the observation ports 165 and 165'. It should be here noted that by the use of the observation ports 165 and 165' a watch may be kept on the wort passing over the strainer plate 34 and the strainer plate 58 to determine if any changes in adjustment are necessary. It also is to be understood that the use of the vapor-proof lights 163 and 164 mentioned in the preceeding paragraph is not its only use but the said lights may be used to illuminate the interior of the strainer housing during the cleaning and sterilization thereof.

It is now believed that there has been provided a strainer or separator for straining off a liquid from solid particles that accomplishes the objects initially set forth.

What is claimed is:

1. In a device of the class described the combination of a housing comprising a front wall, a back wall, end walls and a top, said top having a portion which is normal to the front and back walls and an inclined portion, a first strainer trough having a strainer plate bottom within said housing beneath said normal portion of the top with said first strainer trough having a receiving end and a discharge end, means for delivering material to be strained to the receiving end of the strainer trough and relative to which the material moves by gravity, a second strainer trough having a strainer plate bottom within the housing located in a plane beneath the first strainer trough and laterally offset to be beyond the first strainer trough to one side thereof and beneath the inclined portion of the housing top with said second strainer trough having a receiving end and a discharge end, means securing said second strainer trough within the housing to have its strainer plate bottom permanently upwardly inclined, a chute for delivering the material being strained from the discharge end of the first strainer trough to the receiving end of the second strainer trough, means positively engaging and moving the material up the second strainer trough strainer plate bottom, a discharge chute at the upper end of the second strainer trough, and means mounting the discharge chute for adjustment to upwardly incline with respect to the second strainer trough strainer plate bottom for retarding the discharge of material from the second strainer trough to permit draining of the material being strained.

2. In a device of the class described the combination of a housing comprising a front wall, a back wall, end walls and a top, said top having a portion which is normal to the front and back walls and an inclined portion, a first strainer trough having a strainer plate bottom within housing beneath said normal portion of the top with said first strainer trough having a receiving end and a discharge end, means for delivering material to be strained to the receiving end of the strainer trough and relative to which the material moves by gravity, a second strainer trough having a strainer plate bottom within the housing located in a plane beneath the first strainer trough and laterally offset to be beyond the first strainer trough to one side thereof and beneath the inclined portion of the housing top with said second strainer trough having a receiving end and a discharge end, means securing said second strainer trough within the housing to have its strainer plate bottom permanently upwardly inclined, a chute for delivering the material being strained from the discharge end of the first strainer trough to the receiving end of the second strainer trough, means positively engaging and moving the material up the second strainer trough strainer plate bottom, a discharge chute at the upper end of the second strainer trough, means mounting the discharge chute for adjustment to upwardly incline with respect to the second strainer trough strainer plate bottom for retarding the discharge of material from the second strainer trough to permit draining of the material being strained, and means below the second strainer trough strainer plate bottom operable through said strainer plate bottom sparging the material in the second strainer trough as it moves therethrough.

3. In a device of the class described the combination of a housing comprising a front wall, a back wall, end walls and a top, said top having a portion which is normal to the front and back walls and an inclined portion, a first strainer trough having a strainer plate bottom within said housing beneath said normal portion of the top with said first strainer trough having a receiving end and a discharge end, means for hingedly connecting the receiving end of the first strainer trough to the housing, a U-shaped connecting member connected to the discharge end of the first strainer trough, an elevating screw upwardly projecting from said U-shaped connecting member, a sleeve nut exteriorly of the housing in threaded engagement with the elevating screw with said sleeve nut operable for axially adjusting the screw for raising and lowering the discharge end of said first strainer trough to vary its angle of inclination, means for delivering material to be strained to the receiving end of the first strainer trough and relative to which the material moves by gravity, a second strainer trough having a strainer plate bottom within the housing located in a plane beneath the first strainer trough and laterally offset to be beyond the first strainer trough to one side thereof and beneath the inclined portion of the housing top with said second strainer trough having a receiving end and a discharge end, a chute for delivering the material being strained from the discharge end of the first strainer trough to the receiving end of the second strainer trough, means for permanently mounting the second strainer trough strainer plate bottom at an upward angle, a discharge plate at the discharge end of the second strainer trough, means pivotally mounting said discharge plate to the housing, means for adjusting the discharge plate about its hinge mounting and securing same in said adjusted positions, means positively engaging and moving the material up said second strainer trough strainer plate bottom to the discharge plate, and means above said discharge plate sparging the material thereon prior to its discharge.

4. In a device of the class described the combination of a housing comprising a front wall, a back wall, end walls and a top, said top having a portion which is normal to the front and back walls and an inclined portion, a first strainer trough having a strainer plate bottom within said housing beneath said normal portion of the top with said first strainer trough having a receiving end and a discharge end, means for delivering material to be strained to the receiving end of the strainer trough and relative to which the material moves by gravity, a second strainer trough having a strainer plate bottom within the housing located in a plane beneath the first strainer trough and laterally offset to be beyond the first strainer trough to one side thereof and beneath the inclined portion of the housing top with said second strainer trough having a receiving end and a discharge end, said second strainer trough having its strainer plate bottom permanently upwardly inclined, a chute for delivering the material being strained from the discharge end of the first strainer trough to the receiving end of the second strainer trough, a plurality of power actuated pusher members each having teeth projecting therefrom toward the second strainer trough strainer plate bottom with the ends of said teeth arched oppositely to the direction of movement thereof, a link chain connected to each end of the pusher members, and power actuated driving sprockets for simultaneously actuating said chains.

References Cited in the file of this patent

UNITED STATES PATENTS

| | | |
|---|---|---|
| 293,983 | Roper | Feb. 19, 1884 |
| 359,498 | Card | Mar. 15, 1887 |
| 907,947 | Asplund | Dec. 29, 1908 |
| 984,434 | Laubenheimer | Feb. 14, 1911 |
| 996,624 | Dorr | July 4, 1911 |
| 1,320,324 | Dunkle | Oct. 28, 1919 |
| 1,483,667 | Landreth et al. | Feb. 12, 1924 |
| 1,535,750 | Tracy | Apr. 28, 1925 |
| 1,784,132 | Cabrera | Dec. 9, 1930 |
| 1,932,827 | Morris et al. | Oct. 31, 1933 |
| 1,968,545 | Van Arsdale | July 31, 1934 |
| 2,014,834 | Coffey | Sept. 17, 1935 |
| 2,146,692 | Tiedman | Feb. 7, 1939 |
| 2,158,169 | Wright | May 16, 1939 |
| 2,329,333 | Carter | Sept. 14, 1943 |
| 2,404,944 | Brassert | July 30, 1946 |
| 2,435,455 | Mathews | Feb. 3, 1948 |
| 2,441,526 | Zollinger | May 11, 1948 |
| 2,501,487 | Whitman | Mar. 21, 1950 |

FOREIGN PATENTS

| | | |
|---|---|---|
| 289,774 | Germany | Jan. 21, 1916 |